United States Patent
Raimondo

(10) Patent No.: US 12,197,471 B2
(45) Date of Patent: Jan. 14, 2025

(54) SYSTEMS AND METHODS FOR DISPLAYING AND MANIPULATING TIMELINE OBJECTS USING MOTION

(71) Applicant: Joseph Raimondo, Haddonfield, NJ (US)

(72) Inventor: Joseph Raimondo, Haddonfield, NJ (US)

( * ) Notice: Subject to any disclaimer, the term of this patent is extended or adjusted under 35 U.S.C. 154(b) by 130 days.

(21) Appl. No.: 18/117,179

(22) Filed: Mar. 3, 2023

(65) Prior Publication Data

US 2024/0296172 A1    Sep. 5, 2024

(51) Int. Cl.
| | | |
|---|---|---|
| *G06F 16/28* | (2019.01) | |
| *G06F 3/01* | (2006.01) | |
| *G06F 3/0346* | (2013.01) | |
| *G06F 3/04815* | (2022.01) | |
| *G06F 18/22* | (2023.01) | |

(52) U.S. Cl.
CPC ............ *G06F 16/283* (2019.01); *G06F 3/011* (2013.01); *G06F 3/0346* (2013.01); *G06F 3/04815* (2013.01); *G06F 18/22* (2023.01); *G06F 2203/04802* (2013.01)

(58) Field of Classification Search
CPC .... G06F 3/011; G06F 3/0346; G06F 3/04815; G06F 16/283; G06F 18/21; G06F 18/22; G06F 18/21375; G06F 18/231; G06F 2203/04802; G06T 3/00; G06T 17/00; H04N 13/178; H04N 13/221
See application file for complete search history.

(56) References Cited

U.S. PATENT DOCUMENTS

| | | | |
|---|---|---|---|
| 9,817,406 B1 | 11/2017 | Thielman | |
| 9,886,038 B2 | 2/2018 | Webber et al. | |
| 11,172,248 B2 * | 11/2021 | Schwartz | ........... H04N 21/8133 |
| 2013/0232667 A1 | 9/2013 | Leon | |
| 2014/0307956 A1 * | 10/2014 | Criminisi | .............. G06F 18/231 |
| | | | 382/173 |
| 2017/0173262 A1 | 6/2017 | Veltz | |
| 2019/0213778 A1 * | 7/2019 | Du | .......................... G06T 15/04 |
| 2023/0403459 A1 * | 12/2023 | Shreve | ................... G06V 20/20 |

FOREIGN PATENT DOCUMENTS

WO    2015023670 A1    2/2015

\* cited by examiner

*Primary Examiner* — Marcin R Filipczyk
(74) *Attorney, Agent, or Firm* — Ariel S. Bentolila; Bay Area IP Group

(57) ABSTRACT

A device including a field programmable gate array is configured to set a coherent clock time frame for data captured. The gate array creates metadata that is operable for capturing a state of each of a plurality of faces of an information space. A geodesic lens comprises a geodesic equation that creates metadata from the captured data. An anamorphic display engine is used to transduce a plurality of visual dimensions of related foreground and background objects and render the objects relative motion in time.

15 Claims, 11 Drawing Sheets

SYSTEMS AND METHODS FOR DISPLAYING AND MANIPULATING TIMELINE OBJECTS USING MOTION

INCORPORATION BY REFERENCE OF SEQUENCE LISTING PROVIDED AS A TEXT FILE

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection by the author thereof. The copyright owner has no objection to the facsimile reproduction by anyone of the patent document or patent disclosure for the purposes of referencing as patent prior art, as it appears in the Patent and Trademark Office, patent file or records, but otherwise reserves all copyright rights whatsoever.

BACKGROUND OF THE RELEVANT PRIOR ART

One or more embodiments of the invention generally relate to systems and methods for generating a four-dimensional object type and encoding key. More particularly, certain embodiments of the invention relate to systems and method for encoding physical and haptic input and feedback to drive an interface that allows a user to interact with complex timeline objects (e.g., applications, data feeds, and other guidance objects) by generating a four-dimensional object type and encoding key.

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Ordinarily, people may wish to display and manipulate numerous information streams more effectively. Cloud computing and proliferating social interfaces make navigation increasingly unwieldy using conventional two-dimensional interfaces. Data centered applications may place increasing demands on knowledge workers who may face growing constraints on the ability to manage data, the limits of using a two-dimensional plane for navigating and operating may become increasingly constrained.

Generally, the use of and access to data and media sources continues to grow at rates approaching exponential. The complexity of dealing with this data glut encounters a barrier in the over-emphasis in the design thinking on two-dimensional user interfaces. Typically, data and matter may merge in new and novel ways. Quantum physics may manipulate data and that data may stream into a set of emerging media types to engage users. Generally speaking, the user interface paradigm in which we now utilize may be inadequate as a means to drive expanded capabilities. Ordinarily, the emerging future may call for an expanded horizon for interface. More often than not, humans may work in 4-dimensions, intentionally and functionally.

The following is an example of a specific aspect in the prior art that, while expected to be helpful to further educate the reader as to additional aspects of the prior art, is not to be construed as limiting the present invention, or any embodiments thereof, to anything stated or implied therein or inferred thereupon. By way of educational background, another aspect of the prior art generally useful to be aware of is that typical interface devices have primarily been built to drive a two-dimensional interface field. The interface devices may traverse and render x and y axes on a display, and even when a third axis may provide relative motion and depth, on average, there may be no intrinsic use of time slices as a means to provide an additional dimension as context for using the interface devices. Traditionally, existing technologies may be primarily oriented around manipulating time-stamped objects using x-y axis orientation (e.g., tables). Typically, the existing technologies use polygon rendering to simulate three dimensions through visual manipulation. The existing technologies may not effectively tie full x, y, and z-axis data into rendering of the system. Existing systems may not use a geodesic algorithm embedded in a programmable gateway device to achieve a performance level of encoding and decoding. Likewise, existing approaches may not be built with anamorphic rendering in mind to present a physically distinct rendering of three dimensions.

On the whole, think about the next few decades and the types of technology that are envisioned to come online. Think of the situation room dealing with large-scale disruption in a complex urban environment—imagine that terrain now covered in nanoparticles that pass telemetry and sensory data at high resolution—using laser reflectance to move data. Think of the accumulated glut of data from that. Can we continue to use two-dimensional technology—the window/icon/mouse and flat two-dimensional orientation of modern social mobile devices—to adequately map and manage these data environments? Fundamentally, there may be equally complex data environments that may now beginning to understand in terms of the ability to create nuanced views of data and to impose rules and direction on how data can be generated, manipulated, and shared using four-dimensional metadata as a reference.

Currently, the fundamental device design paradigm fails to scale to map and model the impending problem of accelerating complexity in data environments. Imagine a team overseeing massive data streams across multiple discernible dimensions in the aforementioned urban scene. Will an array of people hovering around screens adequately address the sheer complexity that these hyper-real data streams present? At some point, in a two-dimensional model, it all converges to noise. For the most part, there is a need to expand the palette and the vocabulary of interfaces to be able to distinguish and share symbols in an expanded dimensional sense.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
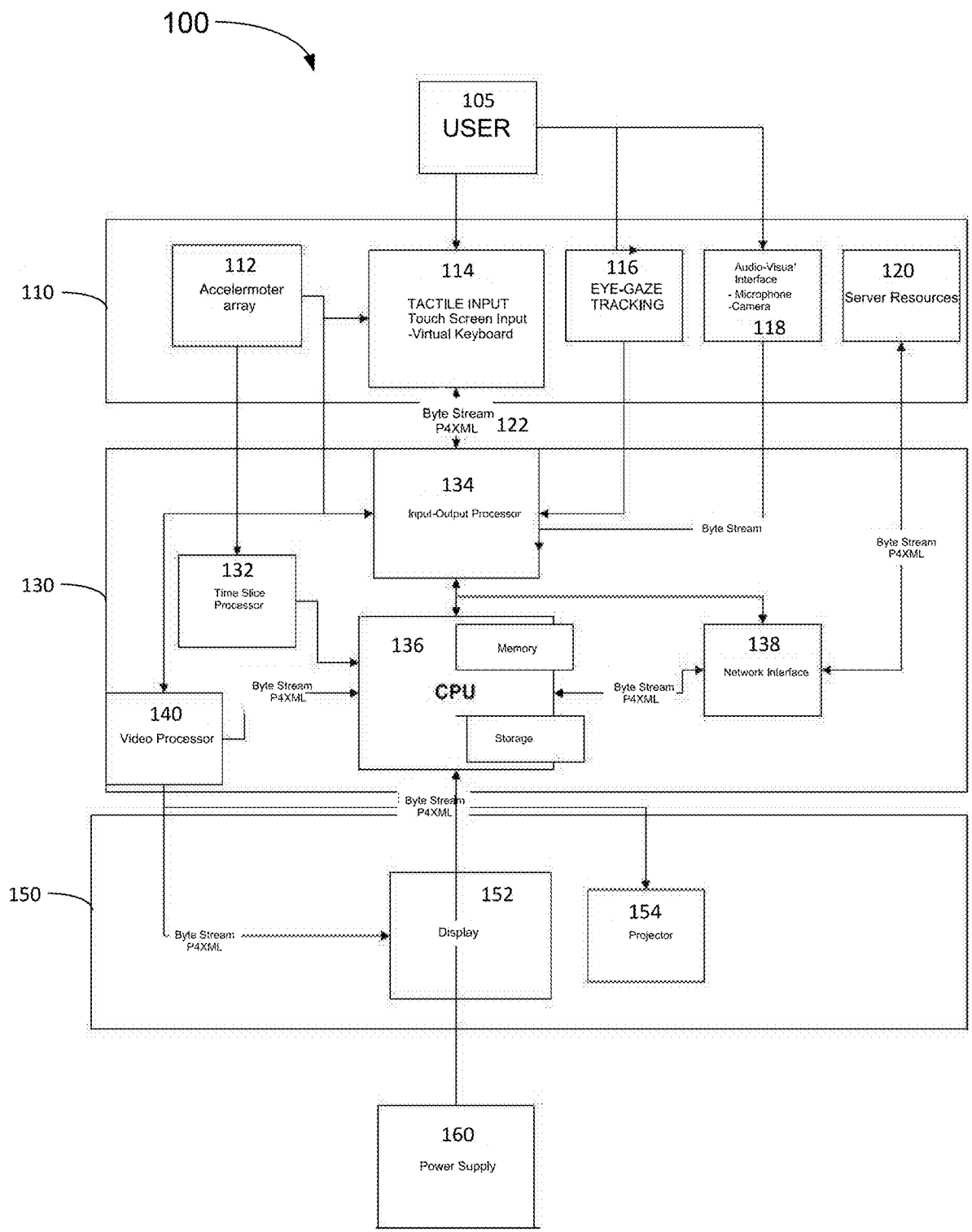
FIG. 1 is an illustration of an exemplary device block diagram, in accordance with an embodiment of the present invention.

Unless otherwise indicated illustrations in the figures are not necessarily drawn to scale.

DETAILED DESCRIPTION OF SOME EMBODIMENTS

The present invention is best understood by reference to the detailed figures and description set forth herein.

Physical verb is a combination of motion(s) that are captured along with characterization of the state of the applications in use through a given timeframe. The ability to capture the experiential structure of how an insight is generated, then the further ability to share that process, in real time, with the system state stored in the background and accessible for further application.

Transduction is a process for generating a unique key structure that encodes and compresses using geodesic equations.

Timeprint is the process by which transduction comprise of compressed data from a state-save, the x, y, and z-axis data from the accelerometer and haptics interface, and the time stamp generated by a system state timer. The generated keys are used to identify specific objects.

4-dimensional extensible Markup Language (P4XML) may include a software markup language that handles all the rendering and processing necessary for the device to display information on device surface as well as to pass information back and forth to underlying virtual resources (e.g., servers and other information services. At the head of each P4XML object is a 4D key described in the previous step.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

All words of approximation as used in the present disclosure and claims should be construed to mean "approximate," rather than "perfect," and may accordingly be employed as a meaningful modifier to any other word, specified parameter, quantity, quality, or concept. Words of approximation, include, yet are not limited to terms such as "substantial", "nearly", "almost", "about", "generally", "largely", "essentially", "closely approximate", etc.

As will be established in some detail below, it is well settled law, as early as 1939, that words of approximation are not indefinite in the claims even when such limits are not defined or specified in the specification.

For example, see Ex parte Mallory, 52 USPQ 297, 297 (Pat. Off. Bd. App. 1941) where the court said "The examiner has held that most of the claims are inaccurate because apparently the laminar film will not be entirely eliminated. The claims specify that the film is "substantially" eliminated and for the intended purpose, it is believed that the slight portion of the film which may remain is negligible. We are of the view, therefore, that the claims may be regarded as sufficiently accurate."

Note that claims need only "reasonably apprise those skilled in the art" as to their scope to satisfy the definiteness requirement. See Energy Absorption Sys., Inc. v. Roadway Safety Servs., Inc., Civ. App. 96-1264, slip op. at 10 (Fed. Cir. Jul. 3, 1997) (unpublished) Hybridtech v. Monoclonal Antibodies, Inc., 802 F.2d 1367, 1385, 231 USPQ 81, 94 (Fed. Cir. 1986), cert. denied, 480 U.S. 947 (1987). In addition, the use of modifiers in the claim, like "generally" and "substantial," does not by itself render the claims indefinite. See Seattle Box Co. v. Industrial Crating & Packing, Inc., 731 F.2d 818, 828-29, 221 USPQ 568, 575-76 (Fed. Cir. 1984).

Moreover, the ordinary and customary meaning of terms like "substantially" includes "reasonably close to: nearly, almost, about", connoting a term of approximation. See In re Frye, Appeal No. 2009-006013, 94 USPQ2d 1072, 1077, 2010 WL 889747 (B.P.A.I. 2010) Depending on its usage, the word "substantially" can denote either language of approximation or language of magnitude. Deering Precision Instruments, L.L.C. v. Vector Distribution Sys., Inc., 347 F.3d 1314, 1323 (Fed. Cir. 2003) (recognizing the "dual ordinary meaning of th[e] term ["substantially"] as connoting a term of approximation or a term of magnitude"). Here, when referring to the "substantially halfway" limitation, the Specification uses the word "approximately" as a substitute for the word "substantially" (Fact 4). (Fact 4). The ordinary meaning of "substantially halfway" is thus reasonably close to or nearly at the midpoint between the forwardmost point of the upper or outsole and the rearwardmost point of the upper or outsole.

Similarly, the term 'substantially' is well recognized in case law to have the dual ordinary meaning of connoting a term of approximation or a term of magnitude. See Dana Corp. v. American Axle & Manufacturing, Inc., Civ. App. 04-1116, 2004 U.S. App. LEXIS 18265, *13-14 (Fed. Cir. Aug. 27, 2004) (unpublished). The term "substantially" is commonly used by claim drafters to indicate approximation. See Cordis Corp. v. Medtronic AVE Inc., 339 F.3d 1352, 1360 (Fed. Cir. 2003) ("The patents do not set out any numerical standard by which to determine whether the thickness of the wall surface is 'substantially uniform.' The term 'substantially,' as used in this context, denotes approximation. Thus, the walls must be of largely or approximately uniform thickness."); see also Deering Precision Instruments, LLC v. Vector Distribution Sys., Inc., 347 F.3d 1314, 1322 (Fed. Cir. 2003); Epcon Gas Sys., Inc. v. Bauer Compressors, Inc., 279 F.3d 1022, 1031 (Fed. Cir. 2002). We find that the term "substantially" was used in just such a manner in the claims of the patents-in-suit: "substantially uniform wall thickness" denotes a wall thickness with approximate uniformity.

It should also be noted that such words of approximation as contemplated in the foregoing clearly limits the scope of claims such as saying 'generally parallel' such that the adverb 'generally' does not broaden the meaning of parallel. Accordingly, it is well settled that such words of approximation as contemplated in the foregoing (e.g., like the phrase 'generally parallel') envisions some amount of deviation from perfection (e.g., not exactly parallel), and that such words of approximation as contemplated in the foregoing are descriptive terms commonly used in patent claims to avoid a strict numerical boundary to the specified parameter. To the extent that the plain language of the claims relying on such words of approximation as contemplated in the foregoing are clear and uncontradicted by anything in the written description herein or the figures thereof, it is improper to rely upon the present written description, the figures, or the prosecution history to add limitations to any of the claim of the present invention with respect to such words of approximation as contemplated in the foregoing. That is, under such circumstances, relying on the written description and prosecution history to reject the ordinary and customary meanings of the words themselves is impermissible. Sec, for example, Liquid Dynamics Corp. v. Vaughan Co., 355 F.3d 1361, 69 USPQ2d 1595, 1600-01 (Fed. Cir. 2004). The plain language of phrase 2 requires a "substantial helical flow." The term "substantial" is a meaningful modifier implying "approximate," rather than "perfect." In Cordis Corp. v. Medtronic AVE, Inc., 339 F.3d 1352, 1361 (Fed. Cir. 2003), the district court imposed a precise numeric constraint on the term "substantially uniform thickness." We noted that the proper interpretation of this term was "of largely or approximately uniform thickness" unless something in the prosecution history imposed the "clear and unmistakable disclaimer" needed for narrowing beyond this simple-language interpretation. Id. In Anchor Wall Systems v. Rockwood Retaining Walls, Inc., 340 F.3d 1298, 1311 (Fed. Cir. 2003)" Id. at 1311. Similarly, the plain language of claim 1 requires neither a perfectly helical flow nor a flow that returns precisely to the center after one rotation (a limitation that arises only as a logical consequence of requiring a perfectly helical flow).

The reader should appreciate that case law generally recognizes a dual ordinary meaning of such words of approximation, as contemplated in the foregoing, as connoting a term of approximation or a term of magnitude; e.g., see Deering Precision Instruments, L.L.C. v. Vector Distrib. Sys., Inc., 347 F.3d 1314, 68 USPQ2d 1716, 1721 (Fed. Cir. 2003), cert. denied, 124 S. Ct. 1426 (2004) where the court was asked to construe the meaning of the term "substantially" in a patent claim. Also see Epcon, 279 F.3d at 1031 ("The phrase 'substantially constant' denotes language of approximation, while the phrase 'substantially below' signifies language of magnitude, i.e., not insubstantial."). Also, sec, e.g., Epcon Gas Sys., Inc. v. Bauer Compressors, Inc., 279 F.3d 1022 (Fed. Cir. 2002) (construing the terms "substantially constant" and "substantially below"); Zodiac Pool Care, Inc. v. Hoffinger Indus., Inc., 206 F.3d 1408 (Fed. Cir. 2000) (construing the term "substantially inward"); York Prods., Inc. v. Cent. Tractor Farm & Family Ctr., 99 F.3d 1568 (Fed. Cir. 1996) (construing the term "substantially the entire height thereof"); Tex. Instruments Inc. v. Cypress Semiconductor Corp., 90 F.3d 1558 (Fed. Cir. 1996) (construing the term "substantially in the common plane"). In conducting their analysis, the court instructed to begin with the ordinary meaning of the claim terms to one of ordinary skill in the art. Prima Tek. 318 F.3d at 1148. Reference to dictionaries and our cases indicates that the term "substantially" has numerous ordinary meanings. As the district court stated, "substantially" can mean "significantly" or "considerably." The term "substantially" can also mean "largely" or "essentially." Webster's New 20th Century Dictionary 1817 (1983).

Words of approximation, as contemplated in the foregoing, may also be used in phrases establishing approximate ranges or limits, where the end points are inclusive and approximate, not perfect; e.g., see AK Steel Corp. v. Sollac, 344 F.3d 1234, 68 USPQ2d 1280, 1285 (Fed. Cir. 2003) where it where the court said [W]e conclude that the ordinary meaning of the phrase "up to about 10%" includes the "about 10%" endpoint. As pointed out by AK Steel, when an object of the preposition "up to" is nonnumeric, the most natural meaning is to exclude the object (e.g., painting the wall up to the door). On the other hand, as pointed out by Sollac, when the object is a numerical limit, the normal meaning is to include that upper numerical limit (e.g., counting up to ten, seating capacity for up to seven passengers). Because we have here a numerical limit—"about 10%"—the ordinary meaning is that that endpoint is included.

In the present specification and claims, a goal of employment of such words of approximation, as contemplated in the foregoing, is to avoid a strict numerical boundary to the modified specified parameter, as sanctioned by Pall Corp. v. Micron Separations, Inc., 66 F.3d 1211, 1217, 36 USPQ2d 1225, 1229 (Fed. Cir. 1995) where it states "It is well established that when the term "substantially" serves reasonably to describe the subject matter so that its scope would be understood by persons in the field of the invention, and to distinguish the claimed subject matter from the prior art, it is not indefinite." Likewise see Verve LLC v. Crane Cams Inc., 311 F.3d 1116, 65 USPQ2d 1051, 1054 (Fed. Cir. 2002). Expressions such as "substantially" are used in patent documents when warranted by the nature of the invention, in order to accommodate the minor variations that may be appropriate to secure the invention. Such usage may well satisfy the charge to "particularly point out and distinctly claim" the invention, 35 U.S.C. § 112, and indeed may be necessary in order to provide the inventor with the benefit of his invention. In Andrew Corp. v. Gabriel Elecs. Inc., 847 F.2d 819, 821-22, 6 USPQ2d 2010, 2013 (Fed. Cir. 1988) the court explained that usages such as "substantially equal" and "closely approximate" may serve to describe the invention with precision appropriate to the technology and without intruding on the prior art. The court again explained in Ecolab Inc. v. Envirochem, Inc., 264 F.3d 1358, 1367, 60 USPQ2d 1173, 1179 (Fed. Cir. 2001) that "like the term 'about,' the term 'substantially' is a descriptive term commonly used in patent claims to 'avoid a strict numerical boundary to the specified parameter, see Ecolab Inc. v. Envirochem Inc., 264 F.3d 1358, 60 USPQ2d 1173, 1179 (Fed. Cir. 2001) where the court found that the use of the term "substantially" to modify the term "uniform" does not render this phrase so unclear such that there is no means by which to ascertain the claim scope.

Similarly, other courts have noted that like the term "about," the term "substantially" is a descriptive term commonly used in patent claims to "avoid a strict numerical boundary to the specified parameter."; e.g., see Pall Corp. v. Micron Seps., 66 F.3d 1211, 1217, 36 USPQ2d 1225, 1229 (Fed. Cir. 1995); see, e.g., Andrew Corp. v. Gabriel Elecs. Inc., 847 F.2d 819, 821-22, 6 USPQ2d 2010, 2013 (Fed. Cir. 1988) (noting that terms such as "approach each other," "close to," "substantially equal," and "closely approximate" are ubiquitously used in patent claims and that such usages, when serving reasonably to describe the claimed subject matter to those of skill in the field of the invention, and to distinguish the claimed subject matter from the prior art, have been accepted in patent examination and upheld by the courts). In this case, "substantially" avoids the strict 100% nonuniformity boundary.

Indeed, the foregoing sanctioning of such words of approximation, as contemplated in the foregoing, has been established as early as 1939, see Ex parte Mallory, 52 USPQ 297, 297 (Pat. Off. Bd. App. 1941) where, for example, the court said "the claims specify that the film is "substantially" eliminated and for the intended purpose, it is believed that the slight portion of the film which may remain is negligible. We are of the view, therefore, that the claims may be regarded as sufficiently accurate." Similarly, In re Hutchison, 104 F.2d 829, 42 USPQ 90, 93 (C.C.P.A. 1939) the court said, "It is realized that "substantial distance" is a relative and somewhat indefinite term, or phrase, but terms and phrases of this character are not uncommon in patents in cases where, according to the art involved, the meaning can be determined with reasonable clearness."

Hence, for at least the forgoing reason, Applicants submit that it is improper for any examiner to hold as indefinite any claims of the present patent that employ any words of approximation.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will be described in detail below with reference to embodiments thereof as illustrated in the accompanying drawings.

References to a "device," an "apparatus," a "system," etc., in the preamble of a claim should be construed broadly to mean "any structure meeting the claim terms" exempt for any specific structure(s)/type(s) that has/(have) been explicitly disavowed or excluded or admitted/implied as prior art in the present specification or incapable of enabling an object/aspect/goal of the invention. Furthermore, where the present specification discloses an object, aspect, function, goal, result, or advantage of the invention that a specific prior art structure and/or method step is similarly capable of performing yet in a very different way, the present invention disclosure is intended to and shall also implicitly include and cover additional corresponding alternative embodiments that are otherwise identical to that explicitly disclosed except that they exclude such prior art structure(s)/step(s), and shall accordingly be deemed as providing sufficient disclosure to support a corresponding negative limitation in a claim claiming such alternative embodiment(s), which exclude such very different prior art structure(s)/step(s) way(s).

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment." "example embodiment," "various embodiments," "some embodiments," "embodiments of the invention," etc., may indicate that the embodiment(s) of the invention so described may include a particular feature, structure, or characteristic, but not every possible embodiment of the invention necessarily includes the particular feature, structure, or characteristic. Further, repeated use of the phrase "in one embodiment," or "in an exemplary embodiment." "an embodiment," do not necessarily refer to the same embodiment, although they may. Moreover, any use of phrases like "embodiments" in connection with "the invention" are never meant to characterize that all embodiments of the invention must include the particular feature, structure, or characteristic, and should instead be understood to mean "at least some embodiments of the invention" include the stated particular feature, structure, or characteristic.

References to "user", or any similar term, as used herein, may mean a human or non-human user thereof. Moreover, "user", or any similar term, as used herein, unless expressly stipulated otherwise, is contemplated to mean users at any stage of the usage process, to include, without limitation, direct user(s), intermediate user(s), indirect user(s), and end user(s). The meaning of "user", or any similar term, as used herein, should not be otherwise inferred, or induced by any pattern(s) of description, embodiments, examples, or referenced prior-art that may (or may not) be provided in the present patent.

References to "end user", or any similar term, as used herein, is generally intended to mean late-stage user(s) as opposed to early-stage user(s). Hence, it is contemplated that there may be a multiplicity of different types of "end user" near the end stage of the usage process. Where applicable, especially with respect to distribution channels of embodiments of the invention comprising consumed retail products/services thereof (as opposed to sellers/vendors or Original Equipment Manufacturers), examples of an "end user" may include, without limitation, a "consumer", "buyer", "customer", "purchaser", "shopper", "enjoyer", "viewer", or individual person or non-human thing benefiting in any way, directly or indirectly, from use of. or interaction, with some aspect of the present invention.

In some situations, some embodiments of the present invention may provide beneficial usage to more than one stage or type of usage in the foregoing usage process. In such cases where multiple embodiments targeting various stages of the usage process are described, references to "end user", or any similar term, as used therein, are generally intended to not include the user that is the furthest removed, in the foregoing usage process, from the final user therein of an embodiment of the present invention.

Where applicable, especially with respect to retail distribution channels of embodiments of the invention, intermediate user(s) may include, without limitation, any individual person or non-human thing benefiting in any way, directly or indirectly, from use of, or interaction with, some aspect of the present invention with respect to selling, vending, Original Equipment Manufacturing, marketing, merchandising, distributing, service providing, and the like thereof.

References to "person", "individual", "human", "a party", "animal", "creature", or any similar term, as used herein, even if the context or particular embodiment implies living user, maker, or participant, it should be understood that such characterizations are sole by way of example, and not limitation, in that it is contemplated that any such usage, making, or participation by a living entity in connection with making, using, and/or participating, in any way, with embodiments of the present invention may be substituted by such similar performed by a suitably configured non-living entity, to include, without limitation, automated machines, robots, humanoids, computational systems, information processing systems, artificially intelligent systems, and the like.

It is further contemplated that those skilled in the art will readily recognize the practical situations where such living makers, users, and/or participants with embodiments of the present invention may be in whole, or in part, replaced with such non-living makers, users, and/or participants with embodiments of the present invention. Likewise, when those skilled in the art identify such practical situations where such living makers, users, and/or participants with embodiments of the present invention may be in whole, or in part, replaced with such non-living makers, it will be readily apparent in light of the teachings of the present invention how to adapt the described embodiments to be suitable for such non-living makers, users, and/or participants with embodiments of the present invention. Thus, the invention is thus to also cover all such modifications, equivalents, and alternatives falling within the spirit and scope of such adaptations and modifications, at least in part, for such non-living entities.

Headings provided herein are for convenience and are not to be taken as limiting the disclosure in any way.

The enumerated listing of items does not imply that any or all of the items are mutually exclusive, unless expressly specified otherwise.

It is understood that the use of specific component, device and/or parameter names are for example only and not meant to imply any limitations on the invention. The invention may thus be implemented with different nomenclature/terminology utilized to describe the mechanisms/units/structures/components/devices/parameters herein, without limitation. Each term utilized herein is to be given its broadest interpretation given the context in which that term is utilized.

Terminology. The following paragraphs provide definitions and/or context for terms found in this disclosure (including the appended claims):

"Comprising" And "contain" and variations of them-Such terms are open-ended and mean "including but not limited to". When employed in the appended claims, this term does not foreclose additional structure or steps. Consider a claim that recites: "A memory controller comprising a system cache . . . ." Such a claim does not foreclose the memory controller from including additional components (e.g., a memory channel unit, a switch).

"Configured To." Various units, circuits, or other components may be described or claimed as "configured to" perform a task or tasks. In such contexts, "configured to" or "operable for" is used to connote structure by indicating that the mechanisms/units/circuits/components include structure (e.g., circuitry and/or mechanisms) that performs the task or tasks during operation. As such, the mechanisms/unit/circuit/component can be said to be configured to (or be operable) for perform(ing) the task even when the specified mechanisms/unit/circuit/component is not currently operational (e.g., is not on). The mechanisms/units/circuits/components used with the "configured to" or "operable for" language include hardware—for example, mechanisms, structures, electronics, circuits, memory storing program instructions executable to implement the operation, etc. Reciting that a mechanism/unit/circuit/component is "configured to" or "operable for" perform(ing) one or more tasks is expressly intended not to invoke 35 U.S.C. sctn.112, sixth paragraph, for that mechanism/unit/circuit/component. "Configured to" may also include adapting a manufacturing process to fabricate devices or components that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The terms "a", "an" and "the" mean "one or more", unless expressly specified otherwise.

All terms of exemplary language (e.g., including, without limitation, "such as", "like", "for example", "for instance", "similar to", etc.) are not exclusive of any other, potentially, unrelated, types of examples; thus, implicitly mean "by way of example, and not limitation . . . ", unless expressly specified otherwise.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including." "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" and "consisting of" limits the scope of a claim to the specified elements or method steps, plus those that do not materially affect the basis and novel characteristic(s) of the claimed subject matter (see Norian Corp. v Stryker Corp., 363 F.3d 1321, 1331-32, 70 USPQ2d 1508, Fed. Cir. 2004). Moreover, for any claim of the present invention which claims an embodiment "consisting essentially of" or "consisting of" a certain set of elements of any herein described embodiment it shall be understood as obvious by those skilled in the art that the present invention also covers all possible varying scope variants of any described embodiment(s) that are each exclusively (i.e., "consisting essentially of") functional subsets or functional combination thereof such that each of these plurality of exclusive varying scope variants each consists essentially of any functional subset(s) and/or functional combination(s) of any set of elements of any described embodiment(s) to the exclusion of any others not set forth therein. That is, it is contemplated that it will be obvious to those skilled how to create a multiplicity of alternate embodiments of the present invention that simply consisting essentially of a certain functional combination of elements of any described embodiment(s) to the exclusion of any others not set forth therein, and the invention thus covers all such exclusive embodiments as if they were each described herein.

With respect to the terms "comprising." "consisting of," and "consisting essentially of," where one of these three terms is used herein, the disclosed and claimed subject matter may include the use of either of the other two terms.

Thus, in some embodiments not otherwise explicitly recited, any instance of "comprising" may be replaced by "consisting of" or, alternatively, by "consisting essentially of", and thus, for the purposes of claim support and construction for "consisting of" format claims, such replacements operate to create yet other alternative embodiments "consisting essentially of" only the elements recited in the original "comprising" embodiment to the exclusion of all other elements.

Moreover, any claim limitation phrased in functional limitation terms covered by 35 USC § 112(6) (post AIA 112(f)) which has a preamble invoking the closed terms "consisting of," or "consisting essentially of," should be understood to mean that the corresponding structure(s) disclosed herein define the exact metes and bounds of what the so claimed invention embodiment(s) consists of, or consisting essentially of, to the exclusion of any other elements which do not materially affect the intended purpose of the so claimed embodiment(s).

Devices or system modules that are in at least general communication with each other need not be in continuous communication with each other, unless expressly specified otherwise. In addition, devices or system modules that are in at least general communication with each other may communicate directly or indirectly through one or more intermediaries. Moreover, it is understood that any system components described or named in any embodiment or claimed herein may be grouped or sub-grouped (and accordingly implicitly renamed) in any combination or sub-combination as those skilled in the art can imagine as suitable for the particular application, and still be within the scope and spirit of the claimed embodiments of the present invention. For an example of what this means, if the invention was a controller of a motor and a valve and the embodiments and claims articulated those components as being separately grouped and connected, applying the foregoing would mean that such an invention and claims would also implicitly cover the valve being grouped inside the motor and the controller being a remote controller with no direct physical connection to the motor or internalized valve, as such the claimed invention is contemplated to cover all ways of grouping and/or adding of intermediate components or systems that still substantially achieve the intended result of the invention.

A description of an embodiment with several components in communication with each other does not imply that all such components are required. On the contrary a variety of optional components is described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

In some embodiments of the present invention and variations thereof, relate to systems and methods for generating a four-dimensional object type and encoding key by encoding physical and haptic input and feedback to drive an interface that allows a user to interact with complex timeline objects (e.g., applications, data feeds, and other guidance objects). In one embodiment of the present invention, the system and method provide a geodesic browser, resolving a shortest line distance among related objects in an information navigation space. A geodesic math model to compress a metadata, may enable 32 degrees of navigational freedom in an informational/representational space, using a specialized interface assembly. Enabling a time slice integrator which may provide a replayable and manipulable timeline of the status of all the information objects that the user interacts with. The system and method enable a new domain of interactive events that may add a dimension to human-computer interfaces. The system and method may enable a user to imagine and manipulate multiple dimensions, using specialized interface elements made possible by the assembled device, and to interact with them in novel ways, using an imputed fourth dimension.

In other embodiments of the present invention and variations thereof, relate to systems and methods for encoding computer operating system state, capture user motion details and other haptic input together using a coherent underlying algorithmic structure that enables capture and dissemination of timeline objects which are effectively constituted in four dimensions. A time-key encoding algorithm allows for fast encoding and decoding of timeline objects in fully-realized four dimensions. The timeline objects may be analyzed, organized, and classified as physical verbs, and a novel vocabulary of time encoded physical events, tied to captured and encoded system state data and navigational history, are built from them. New navigational models are built using these encoded timeline objects for specialty applications (e.g., chip design, medical imagery, etc.) and in more general forms (e.g., intelligence applications, team collaboration, etc.) Capturing the time print objects and assembling them into a physical verb requires a specialized hardware platform allowing for motion capture and visual and haptic display and interaction.

In some embodiment, the system and method combine processing inputs from various accelerometers tracking x, y, and z axis motion and graphs it together with temporal tracking in time slice. A reduction routine based on the geodesic solution and/or lens structure converts x, y, z-axis data, system handle data, bytestream data (application detail), and timestamp data into a representation of a wavefront surface of revolution that is then solved for using the above equation. The resulting single value using this geodesic algorithm is the 4D Key. This equation is encoded into the field programmable gate array logic which solves the equation on the CPU b and writes the result into a P4XML wrapper. Per each clock object, the result from the equation is unique and once decoded, can re-display the entire "moment" captured by the algorithm. The geodesic algorithm may encode the display matrix using the 4D model including a truncated icosahedron shape, representing twenty (20) Hexagons and twelve (12) pentagons, which serves as the organizing unit for the internal navigation model.

For a surface of revolution in which y=g (x) is rotated about the x-axis so that the equation of the surface is $$y^2 + z^2 = g^2(x),$$

the surface can be parameterized by
x=u
y=g (u) cos v
z=g (u) sin v.
The equation of the geodesics is then $$v = c_1 \int \frac{\sqrt{1+[g'(u)]^2} \, du}{g(u)\sqrt{[g(u)]^2 - c_1^2}}.$$

The geodesic algorithm, such as that developed to optimize sensory systems and with the equation shown above is applied to the system state, mapping and reducing it using the same geometry as the physical inputs. The time slices are integrated with the motion input and mapped into the physical inputs and with an internal display matrix which uses hyperbolic mapping techniques to provide relative motion coordinated in time slice, resulting in an intrinsically four-dimensional user interface. The system and method may add a fourth dimension into human interface with processors as a means to solve problem solving in higher dimensions. The problem statement that may be explicitly solve is: How to balance a set of intermeshed equations that operate in a five-dimensional data space (e.g., a thought-space). Solving that, by its nature, may require a four-dimensional interface.

In some embodiment, the system and method comprise of the class library and underlying algorithm that processes system state information, along with the capture of x, y, and z-axis data along with haptic data to comprise a timeline object that incorporates the physical data. In some embodiment, an algorithm and integrated hardware may comprise a geodesic lens algorithm, capturing full-fidelity motion from the user as well as capturing operating system application handles, and rendering them using a defined encoded interface structure. The geodesic lens mechanism encodes and decodes time prints which are the result of the data stream being encoded at a particular time, t; the time print is the key structure that results when the sensory and system data are encoded, and a time print identifying key is generated—the entire object, which encodes a unique temporal value is the time print—the key encoded data structure that represents as distinct moment in time and space. An anamorphic decoding technique unpacks the four-dimensional time print and displays the time print objects on the hyperbolic plane, displaying relative temporal distance among object icons from foreground to background.

In some embodiment, the device uses geodesic equations built into a field programmable gate array to create a minimized metadata necessary to capture a state of each of thirty-two (32) defined areas on an information space. The encoding provides a time-encoded index element that weaves a time component into a representation of the objects in an information space. The device uses the geodesic equations that, for the three-dimensional data set comprised of sensory data from the accelerometers and application and system memory handle data from the operating system (system handle process), and the time stamp data from the 4-D unit that produces it; all this data is presented as a wave front represented internally as a three dimensional shape and introduced into the geodesic algorithm (transduction routine) using the following equation: For a surface given parametrically by $I = \int ds = \int \sqrt{dx^2 + dy^2 + dz^2}$, the geodesic can be found by minimizing the arc length. eThe transduction process, capturing ethe in-memory data wavefront, encoding it using the geodesic algorithm routine, produces the time print data object. The key value encodes the haptic and system state data, and the key structure provides a coherence with the sensors and the system clock.

The data is represented as illustrated using the computational tool Mathematica https://mathworld.wolfram.com/Geodesic.html to generate a unique key structure that encodes and compresses (a process referred to as transduction) comprising of the compressed data from a state-save, the x, y, and z-axis data from the accelerometer and haptics interface, and the time stamp generated by the system state timer. The resulting keys are referred to herein as time prints.

In some embodiment, the system uses a 4-dimensional extensible Markup Language a software markup language that handles all the rendering and processing necessary for the device to display information on device surface as well as to pass information back and forth to underlying virtual resources (e.g., servers and other information services). At the head of each P4XML object is a 4D key. In some embodiment, the system uses a field programmable gate array unit that sets a coherent clock time frame for data captured in the device which is a 4-dimensional transduction unit that runs a specialized time weave algorithm. The coordination of the time stamp becomes the key on which a 3D data is encoded. The result of the process is a time print which comprises a metadata for the system. The metadata is then compressed using a geodesic browser identity from the system state. The time print becomes the basis for an output that may be manipulated and explored, with all the elements in the state able to be rendered and manipulated. In some embodiment, the system uses a specialized anamorphic display engine to transduce 3-visual dimensions related foreground and background objects and to render their relative motion in time, with high fidelity. The display engine tracks with the 3-dimensional data captured by the input accelerometer and telemetry array. A state-save brokerage engine determines the optimal level of detail with which to encode time print "moments". Timeprint "moments", as shown in the FIGS. 4—4D Engine sequence diagram—are the temporal reference point for one complete cycle of encoding sensory and stream data and generating output that can be identified and encoded as part of the verb capture process and via a graph database operation, instantiated into the verb library database.

In some embodiment, a 32 face, 60 vertex shape of a common soccer ball is the organizing structure for the state save mechanism, and forms the internal navigation form. Application and data feed States are saved according to the relative locations of objects on the truncated icosahedron shape. The geodesic algorithm precisely implements the geometry of that shape. The internal State save memory application likewise stores that geometry.

The present invention will now be described in detail with reference to embodiments thereof as illustrated in the accompanying drawings.

FIG. 1 is an illustration of an exemplary device block diagram 100, in accordance with an embodiment of the present invention. In one embodiment, device 100 may include but not limited to physical layer 110, internal layer 130, and external layer 150, that communicates with each other using P4XML byte stream 122. Power supply 160 may include but not limited to batteries, or direct AC power using a transformer provides the necessary power to run the system. Physical layer 110 may comprise system components collecting physical inputs but not limited to an accelerometer array 112, tactile input 114 including touch screen input, and/or virtual keyboard, eye-gaze tracking 116, audio-visual interface 118 such as but not limited to microphone, camera, etc., and server resources 120. Internal layer 130 may comprise but not limited to I/O processor 134, time slice processor 132, CPU 136, video processor 140, and network interface 138. External layer 150 may comprise but not limited to display 152 and projector 154. In some embodiment, user 105 may interact with the device using touch screen, and/or virtual keyboard 114. In another embodiment, user 105 may interact with the device using eye gaze tracking technology. In other embodiments, user 105 may interact with the device using audio-visual interface 118 such as but not limited to a microphone, camera, audio sensors, visual sensors, etc. The interaction(s) may be transferred to I/O processor 134 via P4XML byte stream 122. Accelerometer array 112 may include an array of accelerometers and sensors for gauging motion and user activity in a channelized 3D data. Tactile Input 114 may provide gauge points on physical device on which user effectuates activity via the touch screen or keyboard, defined in a library of interactive primitives offered by the system hardware. Eye Gaze tracking 116 facilitates interaction(s) between the optical/camera sensors on device and specialized algorithm. Eye tracking data stream from the visual sensor unit is converted to channelized gaze data. Audio-visual interface 118 or audio/visual sensors may provide camera and/or audio input data streams. Server resources 120 may facilitate connection to processing and data resources through network interface 138 via a bit stream P4XML to distributed system handles passed to a Real-time Operating System (RTOS) and/or central processing unit (CPU) 136.

In some embodiment, internal layer 130 may provide a structure of core CPUs and OS interactions including, but not limited to, Time Slice Processor 132, Input-output Processor 134, Central Processing Unit (CPU) 136, Video Processor 140, and Network Interface 138. Time Slice Processor 132 facilitates a dedicated FPGA process that provides clock coherence. Clock timeframes are written as clock objects which combine with haptic data and system handle data. Input-output Processor 134 may include hardware-software component(s) handling haptic and sensory data input data to oversee data feeds via Byte stream P4XML 122. Central Processing Unit (CPU) 136 may include a memory interface and a storage interface that saves/stores outputs from IO processor 134. Time slice processor 132, and video processor 140 and outputs System handles, IO & network interaction. Video Processor 140 may receive video signals from supply Input-output Processor 134 and outputs video stream and/or Bytestream data to display unit and/or output cloud via network interface 138 and Server resources 120. Network Interface 138 may comprise a Network interface device on board that is configured to provide connection(s) to TCP/IP network and manages interaction with remote services.

In some embodiment, external layer 150 may include components producing audio, video, and visual outputs such as but not limited to display 152 and/or projector 154. Display 152 may include mapped display(s) configured to present video data stream produced by the video processor. Projector 154 may display signaling connected to internal status and may receive output cloud data and enable the data to be rendered by external devices. Power supply 160 may comprise but not limited to batteries, AC unit, solar cells, etc. for providing power to internal components including providing signal to BIOS for post, and transformer for power to the various CPUs and system bus.

Figure 2:
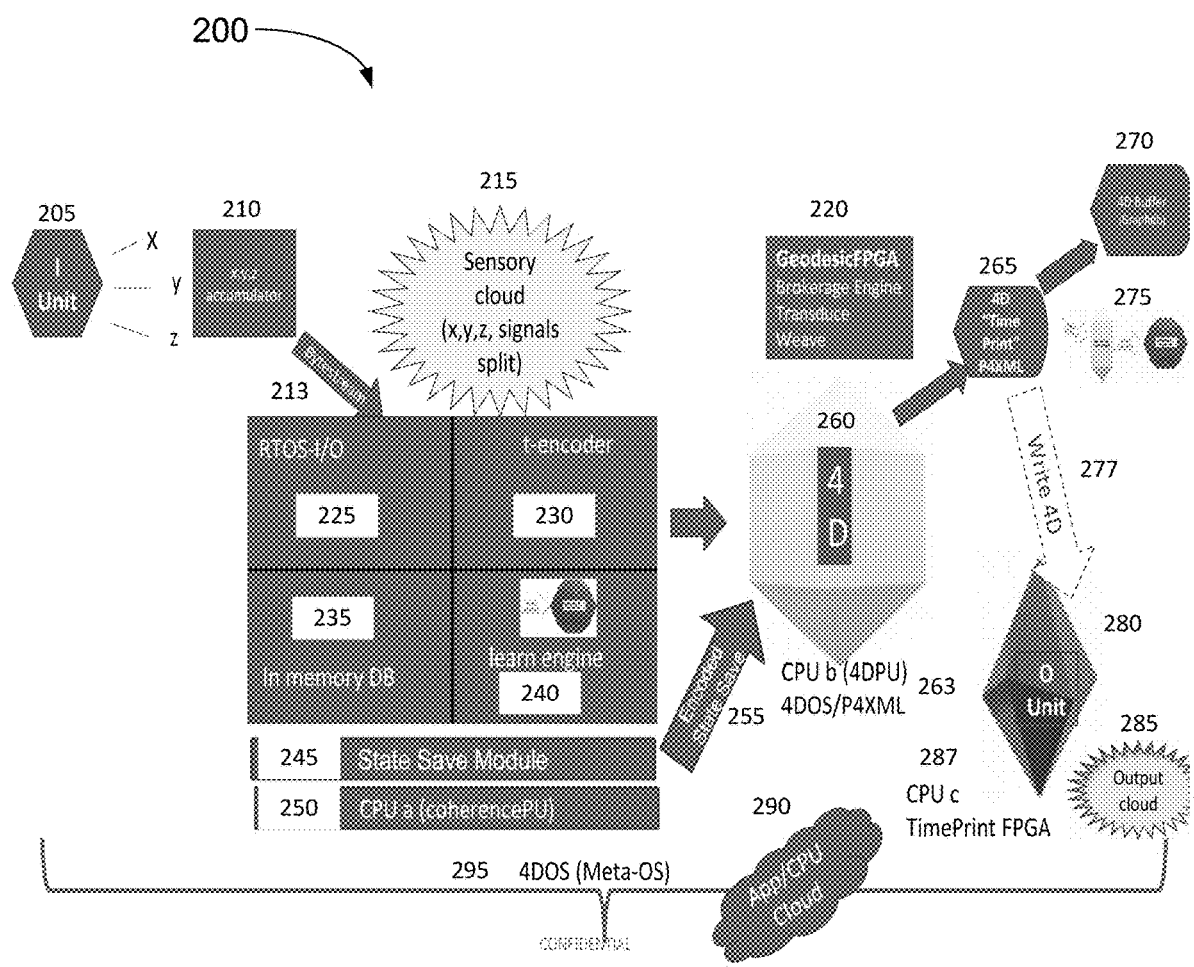
FIG. 2 is an illustration of an exemplary system flowchart, in accordance with an embodiment of the present invention.

FIG. 2 is an illustration of an exemplary system flowchart 200 that lets a user display and manipulate timeline objects using motion, in accordance with an embodiment of the present invention. In one embodiment, system flowchart 200 may include an I/Input-unit 205, X, Y, Z accumulator 210, RTOS-I/O 225, t-encoder 230, in memory DB 235, learn engine 240, state save module 245, sensory cloud 215, geodesic FPGA 220, 4D unit/engine 260, 4D time print 265, 4D buffer 270, O-unit 280, output cloud 285, app/CPU cloud 290, and 4DOS (Meta-OS) 295.

In some embodiment, I/Input-unit 205 may Buffer and normalize the X-, Y-, & Z-axis data from the accelerometer and sensor data. X, Y, Z accumulator 210 may comprise system logic to collect channelized haptic and sensor data from the data stream of the I/Input-unit 205 as input to RTOS for channelized sensory data. Haptic Bytestream 213 may include raw data buffered from X, Y, Z accumulator 210 for data to in memory database buffer and into sensory cloud 215. Sensory cloud (x, y, z signals split) 215 may include Sensory Cloud of channelized (split) haptic signals from haptic Bytestream buffer data for Data to state save module 245. Geodesic FPGA 220 processes wavefront of data from Input units and system including haptic sensory data from sensory cloud, system handles, and Bytestream data from output cloud which are time sampled by the clock and the wavefront data is run through the geodesic transform encoded in the system logic. The result of the code is the key that encodes Timeprint 265. The key structure to be written into P4XML wrapper. RTOS I/O 225 processes data from Input device, system state handles from operating system, and uses geodesic algorithm to create a unique key. Geodesic FPGA 220 is programmed with the geodesic algorithm and also embodies a state save timer that imposes the time (t) stamp as part of the key that is generated.

In some embodiment, t-encoder 230 may include a process that takes a defined clock unit (measured in ms) and writes a time code object from the hardware clock to create a time print temporal object. In memory DB 235 may provide database operation to support a learn engine which classifies and stores the Timeprint objects encoded as verbs which is loaded from RTOS kernel for verb storage. Learn engine 240 provides machine learning algorithmic support for discerning physical verb objects loaded from RTOS kernel and enabling these verbs to be distributed for Graph database of objects containing keys and keys from database written into the P4XML wrapper for stored Timeprint. State save module 245 may combine haptic and temporal data into a single state-save status to create Timeprint(s). CPU b 4D Unit 260 contains process running on CPU b that created P4XML wrapper and generates key. CPU b 4D Unit 260 runs the geodesic algorithm, takes state save object, and create 4D key object. CPU a (Coherence CPU) 250 runs the Real-time Operating System (RTOS) and applications t-encode, learn engineer, and IO interface. State Save Object 255 passes state save object (wrapper) to 4D unit/state save logic for 4D process. 4DProcessing Unit Output 263 wraps 4D Key around data from Bytestream buffer. 4D "Time Print" 265 may include an object comprising of encoded key resulting from geodesic compression that writes a key in P4XML wrapper that represents the compressed wavefront of haptic data, systems handles and pointer to buffered bytestream data. 4D Buffer (Graph DB) 270 facilitates learning process to determine if Timeprint structure or behavior can pass into verb primitive library with P4XML wrapper passed from 4D unit to verb categorization—ML routine adding weight to verb recognition—Classification routine. Bytestream Handler 275 (P4XML Bytestream=>Map Reduce Learn Engine=>P4XML & Bytestream=>Optimized and Categorized) from key structure written in P4XML wrapper to categorized Verbs, language substrate. O (output) Unit 280 coordinates writing out P4XML encoded keyed data (analog to video card). Runs on CPU c 287 where 4D unit 260 writes P4XML to output cloud 285—key interface that supplies output devices (screens, haptic). Output Cloud 285 is a data cloud that serves resources for output devices (screens, haptic) from 4D key and access to pooled output data (video, haptic signaling) as decoded in Out unit. App/CPU Cloud 290 provides resources to connect application threads to networked resources using RTOS IO and network resources. Coordination with Output unit for transmitting cloud application data and system handles. 4DOS (Meta OS) 295 is an operating system on CPU a 250 that handles coordination among applications and provides a Linux kernel shell for RTOS.

In some embodiment, referring to FIGS. 1 and 2, the system combines processing inputs from accelerometer array 112 tracking x, y, and z axis motion and graphs it together with temporal tracking in time slice, which is comprised of the x-, y-, and z-axis data, captured for a representative slice of time as accumulated by 210, the x, y, z accumulator using time slice processor 132. The geodesic lens algorithm is applied to the system state, mapping and reducing it using the same geometry as the physical inputs. The time slices are integrated with the motion input and are then mapped into the physical inputs and with the internal display matrix 152 which uses hyperbolic mapping techniques to provide relative motion coordinated in time slice, resulting in an intrinsically four-dimensional user interface.

In some embodiment, I-unit 205 having specialized accelerometer driven sensory system, an example of which is a GY-86 10DOF MS5611 HMC5883L MPU6050 Module MWC Flight Control Sensor Module which provides Gyro, Acceleration, Magnetic Field, and Air Pressure Sensor readings, and which can be Module can be specially adapted and implemented for this purpose. This device enables 10 degrees of freedom, and provides the primary x, y, and z-axis data interface. The wavefront of x, y, z-axis data plus other channelized sensory data, and the memory handles from each distinct application or data feed running on the real-time OS is at one moment defined by the clock data object. This data wavefront passed to the geodesic reduction algorithm. The result from this algorithm us a unique key that is written by the P4XML module shown in FIG. 4 ties motion into temporal slices x, y, z which is collected in x, y, z accumulator 210. T-encoder 230 runs specialized processes on the Coherence CPU (CPU a) that maintains a coherent clock with which sensory data is combined. State-save module 245 grabs application handles and memory state and compresses them using the geodesic lens algorithm running on the Geodesic FPGA (220). and passes it to 4D unit/engine 260. CPU a (coherence PU) 250 runs specialized system software that connects to cloud CPU resources 215 and which provides administration and logging functions for each subcomponent. CPU a (coherence PU) 250 also manages connection with virtual CPU and application cloud.

Geodesic FPGA 220 runs specialized processes on CPU b, a specialized Field Programmable Gate Array on which is programmed the logic that that transduces the data coming from the sensory cloud 215 and the t-encoder 230 which provides the clock signal, and carries out a process (A "weave" algorithm" that combines (weaves) the haptic and time signal data into a single key structure. Further, the Geodesic FPGA carries out a "Brokerage engine" process that accesses a library of patterns that works to determine whether a given 4D key can be weighted as significant, and a candidate for being saved to the Optimized and Categorized "physical verb" library. A (Coherence CPU) that transduces haptic data (x, y, and z axis) with the temporal (t) dimension coming from the t-encoder 230 in FIG. 2. A specialized screen drive technology 265 using a rendering algorithm that uses the 4D encoding to pass to an anamorphic rendering algorithm is used in virtual 3D rendering and storage 277. Graph database 275 stores output from 4D unit/engine 260 providing retrieval to the Output CPU running on the NVIDIA open-source GPU kernel modules. Optimization intelligence or learn engine 240 is built into the processing unit 250 on the system. The processing unit reads from the 4D Graph data pool and adds objects to the output cloud 285 process. O-Unit 280 is an anamorphic renderer/engine, running as a process of the CPU b/open-source GPU kernel that writes and outputs 4D extensible Markup Language (P4XML) to output cloud 285. Physical verb structures, which comprise of P4XML objects displaying patterns that indicate potential for reuse, with metadata from the Brokerage engine process run on the Geodesic FPGA (220.) The verbs are temporal and haptic patterns that indicate that the user has behaved in a pattern that can be weighed by algorithm as significant. The "physical verb structures", written as metadata into P4XML wrappers, are saved using results from Brokerage Engine 220.

In some embodiment, I-unit 205, x, y, z accumulator 210, RTOS-I/O 225, t-encoder 230, in memory DB 235, learn engine 240, state save module 245, CPU a (coherence PU) 250, sensory cloud 215, geodesic FPGA 220, 4D unit/engine 260, 4D time print 265, 4D buffer 270, O-unit 280, output cloud 285, app/CPU cloud 290, and 4DOS (Meta-OS) 295.

Figure 3:
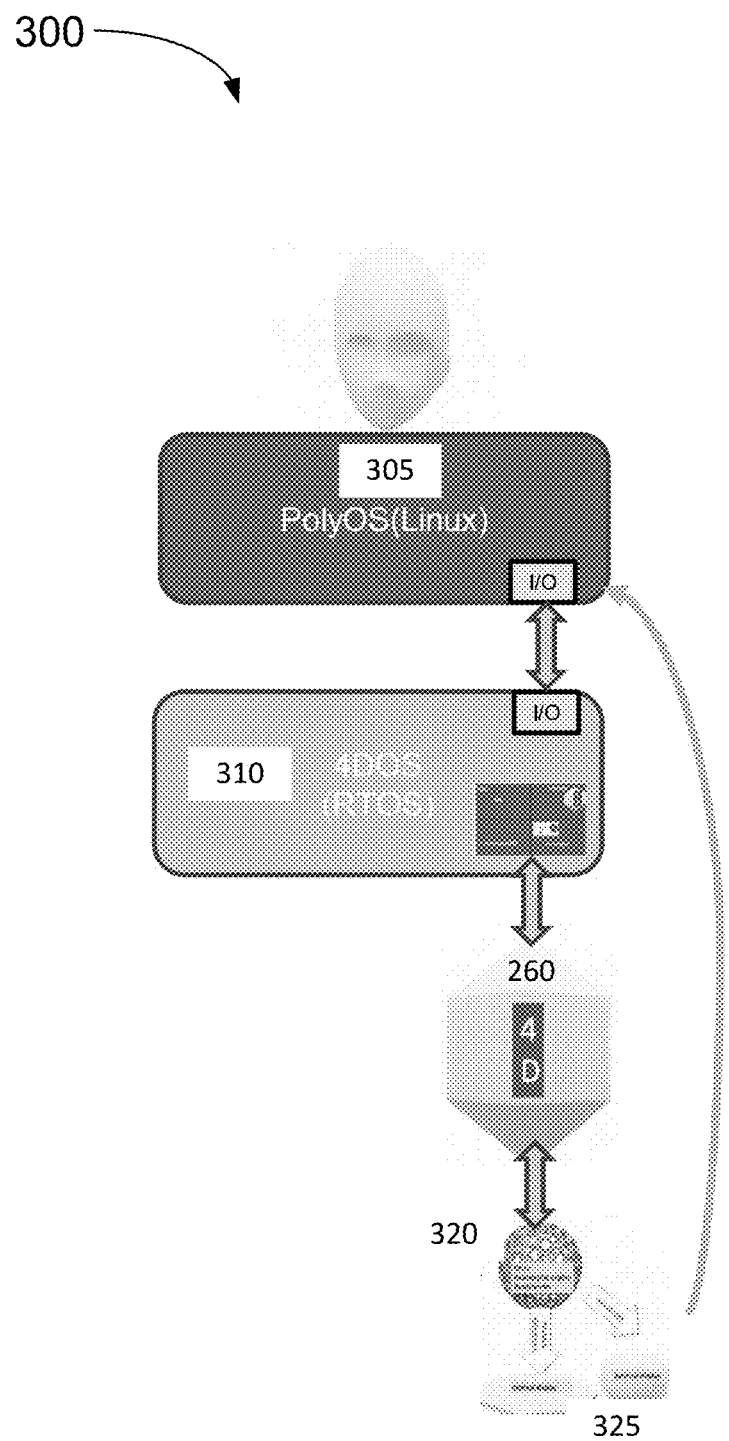
FIG. 3 is an illustration of an exemplary system schematic, in accordance with an embodiment of the present invention.

FIG. 3 is an illustration of an exemplary system schematic of a high-level interaction model for user of system and methods, in accordance with an embodiment of the present invention. FIG. 3 shows PolyOS (Linux) 305, 4DOS (RTOS) 310, 4D unit/engine 260, anamorphic engine 320, and display module 325. In one embodiment, PolyOS (Linux) 305 is an operating system running on CPU a that handles coordination among applications incorporated with output. PolyOS (meta-OS) runs the RTOS as a shelled application. 4DOS (RTOS) 310 may provide the user perspective of 4DOS (Meta OS) operating system. Anamorphic engine 320 may enable anamorphic rendering applications running on Output unit CPU that reads video data and renders using Read/render algorithm. Display module 325 coordinates the general array of output screens, external display screens, and haptic devices receiving signals from the Output Cloud.

Figure 4:
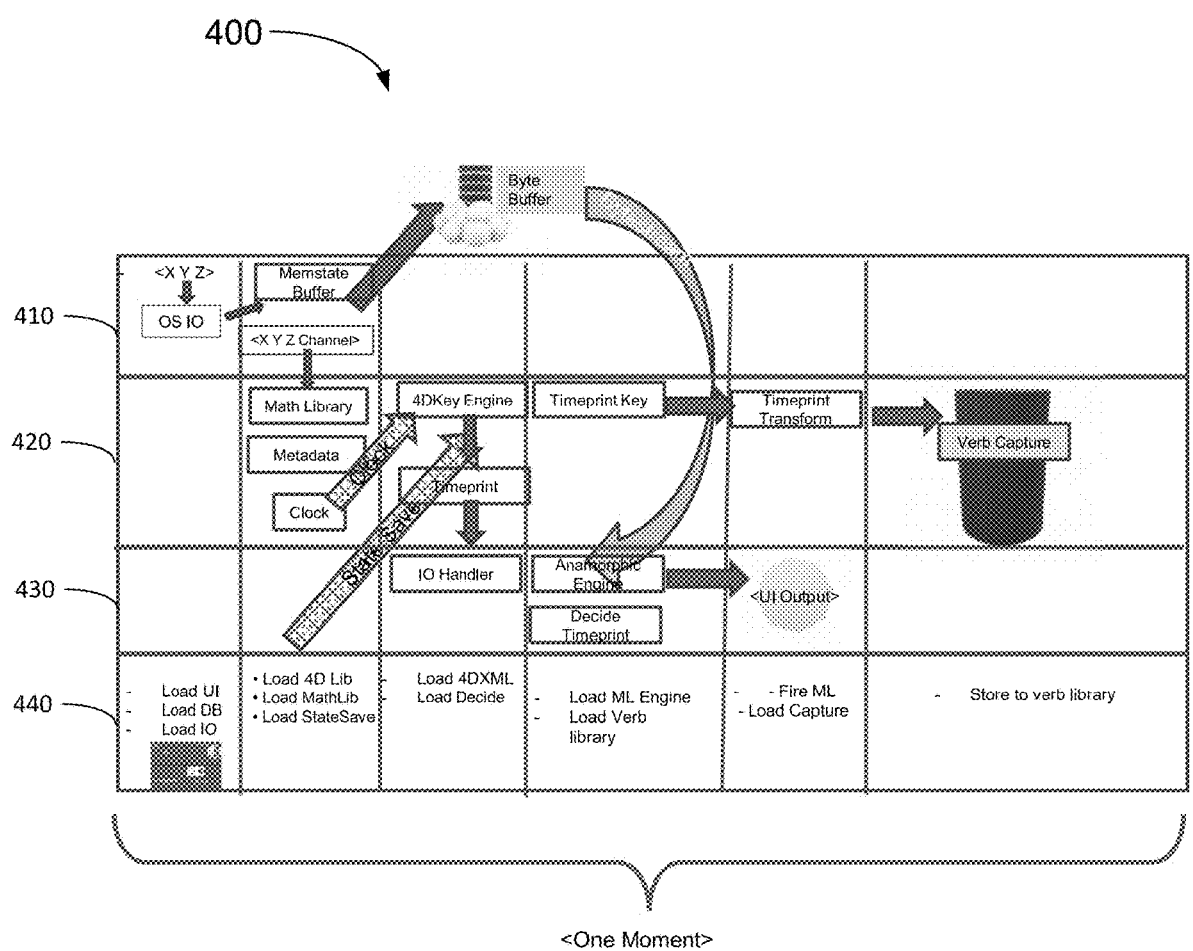
FIG. 4 is an illustration of an exemplary 4D Engine Sequence Diagram, in accordance with an embodiment of the present invention.

FIG. 4 is an illustration of an exemplary moment writing State Diagram, in accordance with an embodiment of the present invention. The State Diagram tracks the process of integrating signals with time stamp to create timeprint keys which are stored, categorized, and distributed. User tracking module 410 tracks OS and sensory arrays. Write timeprint module—verb capture 420 loads and deploy geodesic algorithm to encode 3D and state save wavefront and transform to timeprint and write wrapper to contain key. IO Handling module 430 gets key and byte buffer to write to the output array for keyed object in verb library. Timeprint write and verb creation module 440 may store verb key to library.

Figure 5:
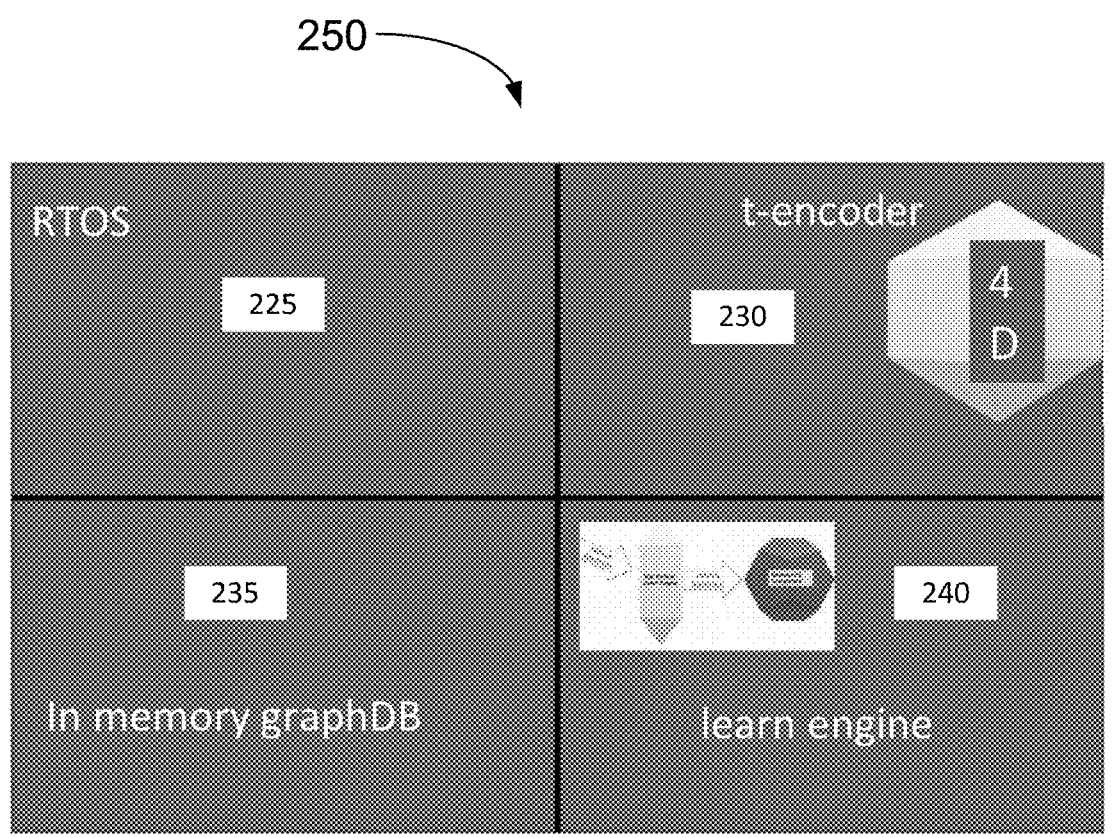
FIG. 5 is an illustration of an exemplary Coherence PU (CPU), in accordance with an embodiment of the present invention.

FIG. 5 is an illustration of an exemplary Coherence PU (CPU) 250, in accordance with an embodiment of the present invention. In one embodiment, Coherence PU (CPU) 250 may comprise RTOS-I/O 225, t-encoder 230, in memory DB 235, and learn engine 240. T-encoder 230 runs specialized processes on a parallel CPU that maintains a coherent clock with which sensory data is combined.

Figure 6:
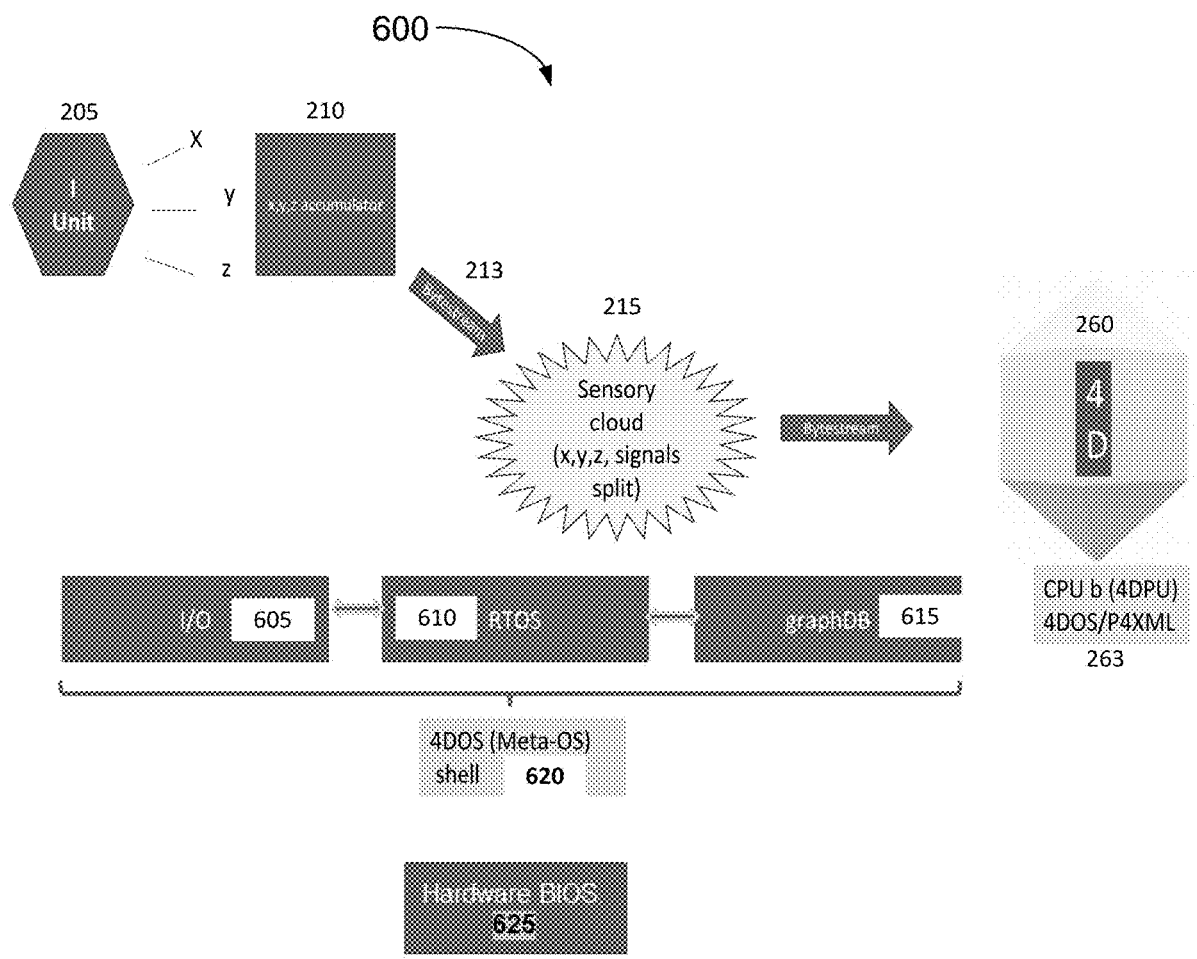
FIG. 6 is an illustration of an exemplary System Basic Input-Output (BIOS) and Operating System (OS) module, in accordance with an embodiment of the present invention.

FIG. 6 is an illustration of an exemplary System BIOS (Basic Input Output System) and Operating System module which provides the operating system shell of the 4D t-encoder module (230) in accordance with an embodiment of the present invention. In one embodiment, I-unit 205 with specialized accelerometer driven sensory system ties motion into temporal slices x, y, z which is collected in x, y, z accumulator 210. Real time operating system (RTOS) schematic 605 provides system resources for coordinating IS, timer and database operations of system state handles that pass to 4D Unit. IO Handler for RTOS 610 supplies IO functions to RTOS from System BIOS. Graph DB 615 is a storage component for logging interactions. Hardware BIOS 625 provides boot up and system Resources for Meta-OS.

Figure 7:
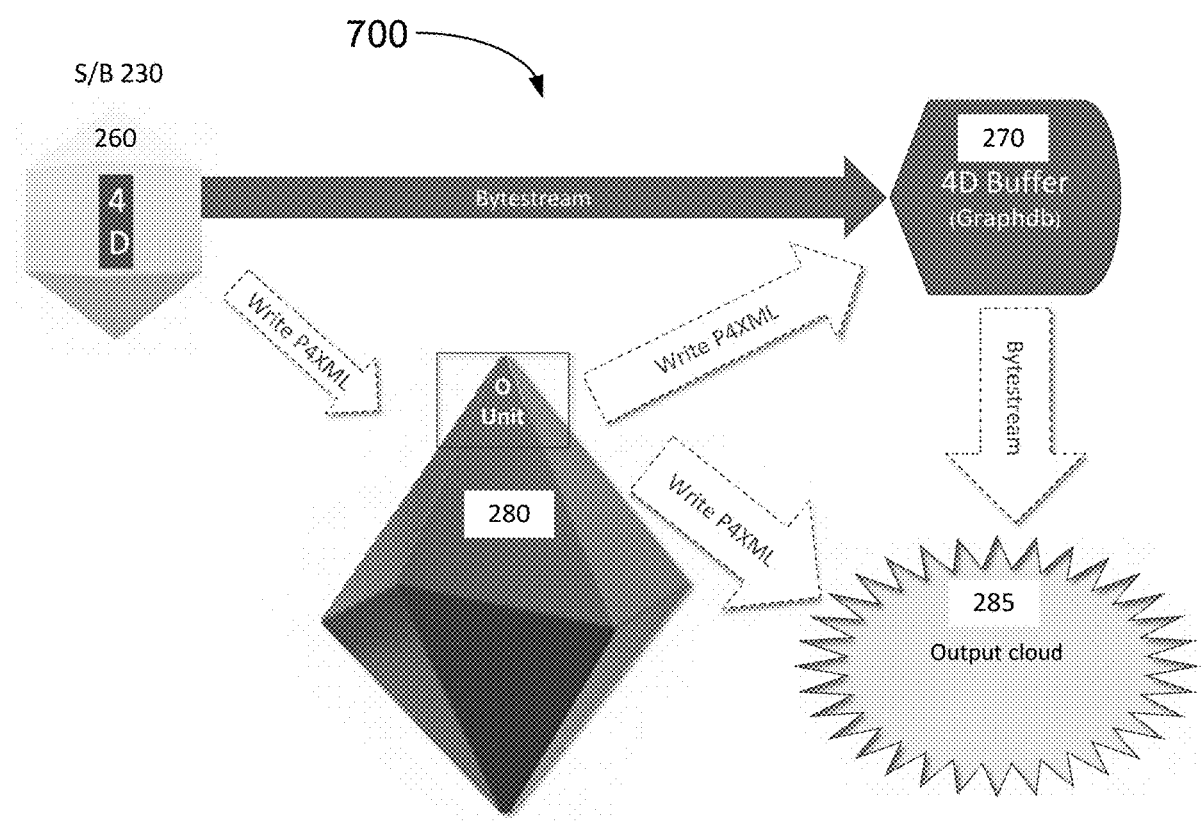
FIG. 7 is an illustration of an exemplary Database Operation & Logic flow Schematic, in accordance with an embodiment of the present invention.

FIG. 7 is an illustration of an exemplary schematic representation of the database and logic schema that shows the order of operation of logic once the 4D Key is written, in accordance with an embodiment of the present invention. In one embodiment, process 700 shows the Key written by 4D CPU 260 by combining channelized haptic data, system handle data from the operating system state save module 245 and Bytestream data passed from the Bytestream buffer combined to be rendered within the Output Unit 280, which writes P4XML structures containing key data (e.g., output from geodesic reduce process.) These P4XML objects are passed to the 4D Buffer 270 which passes the buffered bytestream data to output cloud 285.

Figure 8:
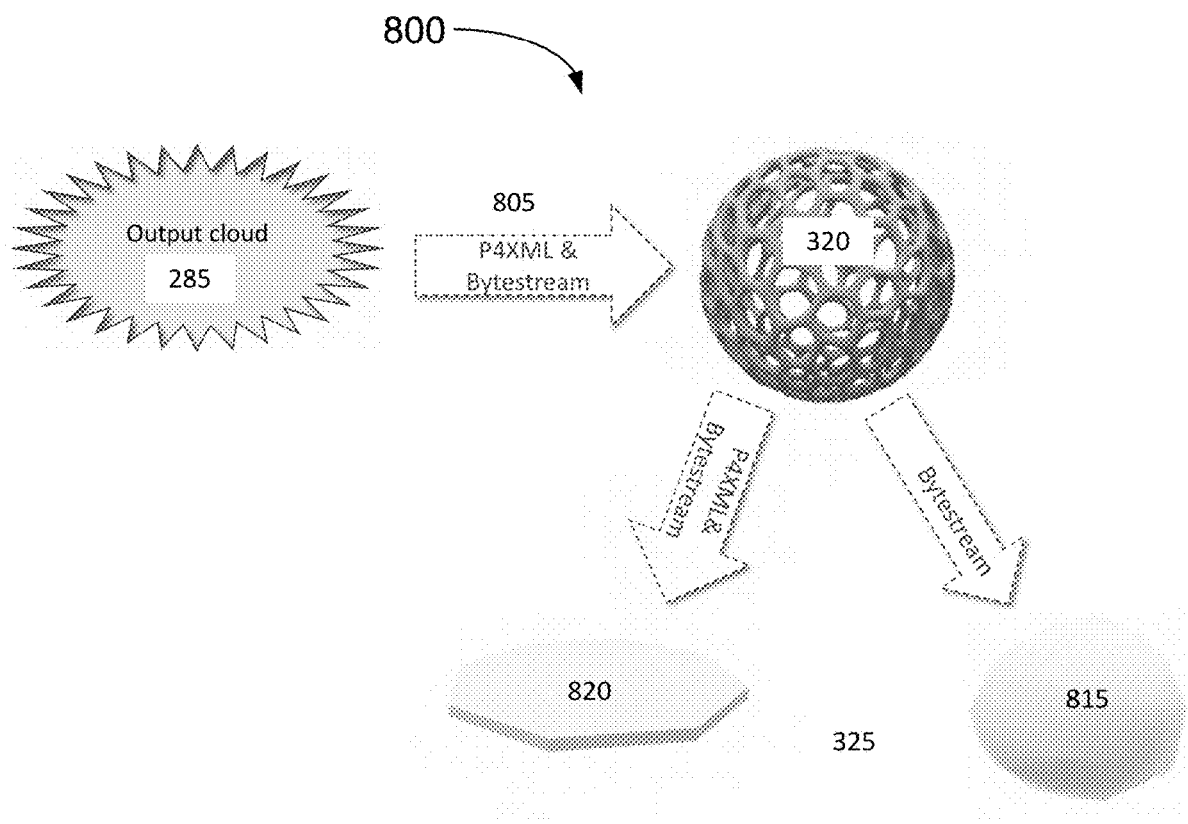
FIG. 8 is an illustration of an exemplary Output Module Overview, in accordance with an embodiment of the present invention.

FIG. 8 is an illustration of an exemplary Output Module, in accordance with an embodiment of the present invention. In one embodiment, anamorphic engine 320 receives data from output cloud 285 via P4XML & Bytestream 805 and provides the data to an internal display 820 or external display 815. P4XML is written as an application memory object or "wrapper" that contains the 1) key encoded by the 4D unit 260 as passed through 4D Processing Unit 263 which Wraps 4D Key around data from Bytestream buffer, sending entire timeprint object to the Output Unit 265. External display 815 is a module that distributes external display signals. Internal display 820 is a module and method that coordinates actions of the internal navigation model. For example, P4XML from rendering engine (320) and Bytestream data from buffer to rendering of navigation space (from 4DKey) over output matrix.

Figure 9:
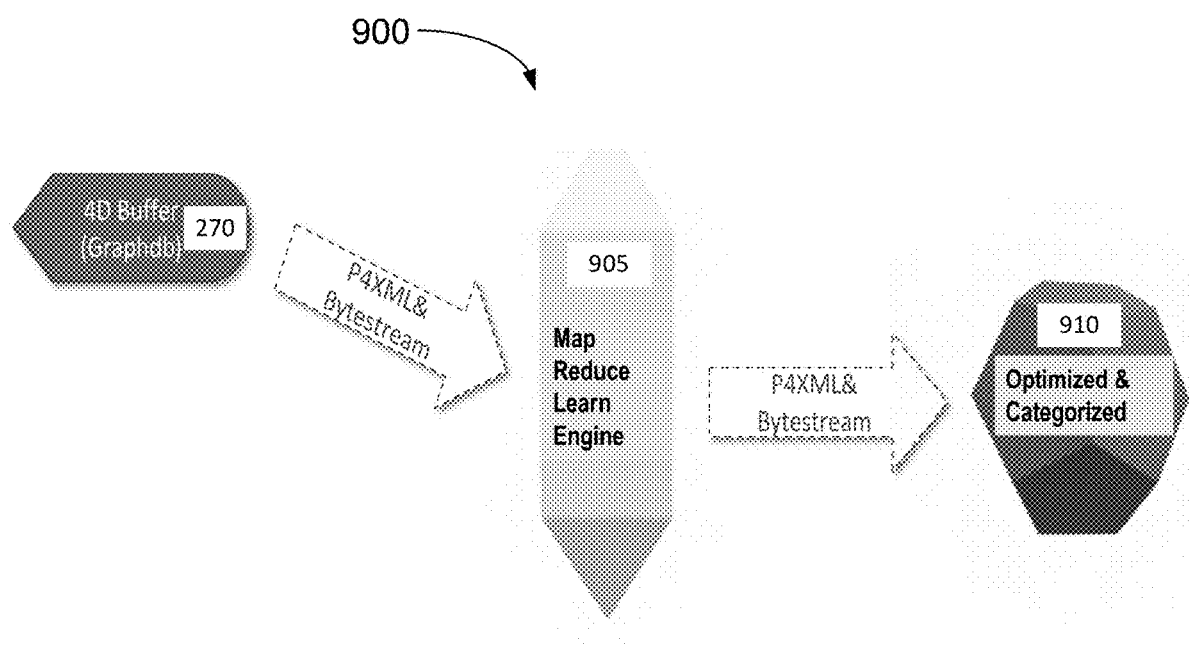
FIG. 9 is an illustration of an exemplary Physical Verb learning-optimization & categorization process schematic, in accordance with an embodiment of the present invention.

FIG. 9 is an illustration of an exemplary Verb learning-optimization & categorization process 900 wherein 4DKeys run through Map Reduce Learn Engine module 905, a machine learning algorithm to determine potential utility as part of an extensible physical verb library. Optimized and categorized 910 module stores the results from the map reduced Learn engine module into the P4XML wrapper, enhancing the key with the results from the learn engine process, in accordance with an embodiment of the present invention. Verb object metadata is written into P4XML wrapper for selected keys. Map Reduce Learn engine 905 running on CPU a (part of RTOS) provides encoded P4XML keys and handles for buffered Bytestream data. Metadata indicating ML routine result to be incorporated into the key's P4XML. Optimized and Categorized module 910 provides 4DKeys determined by weighting algorithm to contribute as a linguistic substrate.

Figure 10:
FIG. 10 is an illustration of an exemplary truncated icosahedron structure representing the internal navigation structures, in accordance with an embodiment of the present invention.

FIG. 10 is an illustration of an exemplary truncated icosahedron structure 1000, in accordance with an embodiment of the present invention. In one embodiment, truncated icosahedron structure 1000 presents an array of 60 vertices. Structure 1000 is a representation of the internal navigation matrix. Referring to FIGS. 1-10, each vertex contains the encoding for the time slice. Each vertex is visible inside the multi-dimensional physical model. For example, the geometry aligns with virtual connections among the multiple lines comprising the vertices. The lines may be weighted, virtually, depending on a strength of signaling from other faces, along other vertices. Therein the matrix may be virtually represented. The geometry enables capture and dissemination of output signaling, based on the geodesic encoding from preceding the 4D Unit process. A 4D Operating System extension implements a 4D model using the truncated icosahedron which serves as the virtual spatial-axial reference for tracking motion of virtual objects in the display matrix. The display matrix using the 4D model may include a truncated icosahedron shape, representing twenty (20) Hexagons and twelve (12) pentagons. Individual applications and data feeds are displayed in each of these shapes. A gyro-sensor/motion-sensor provides the physical orientation of images in relation to another, as the device is physically turned and gyrated. Accumulator 210 manages sensory data from the x-y-z I-unit 205. Array of CPUs 130 coordinates and controls all the processing. 1000 is a representation of the internal navigation matrix. 1005 presents a face on which application, data stream, and agents are displayed as a thumbnail. 1015 represents one vertex which serves as a haptic tracking index for overlaying the navigation matrix.

In some embodiment, the truncated icosahedron shape inscribed as the visual boundary, comprising of 32 faces including 20 hexagons and 12 pentagons which contain information objects (programs) as well as rendering the symmetry available between the objects. The shape is transduced as the organizing unit for the interface. At time point the contents of the inscribed shape are captured in the precise symmetry, and are then compression (transduced) using the geodesic filtering compression mechanism. The compressed artifacts are written as metadata and attached to the contents from the x, y, z array, forming the 4-dimensional time print. The device uses geodesic mapping to encode the data in each object as it is mapped with the temporal data. This enables sequences of motion to be navigated in alternative ways.

In some embodiment, the 32 face, 60 vertex shape of a common soccer ball is the organizing structure for the state save mechanism, and forms the internal navigation form. Application and data feed States are saved according to the relative locations of objects on the truncated icosahedron shape. The geodesic algorithm precisely implements the geometry of that shape. The internal State-save memory application likewise stores that geometry. When a time stamp is created, it grabs the state-save and compresses it using the geodesic algorithm. Likewise, it grabs the x y and z axis geometry and embedded with the state-saved at the time stamp. It drives the system timer, and implements the algorithm to create the time print key.

In some embodiment, a state-save/brokerage engine pseudocode example is as follows:

```
Call geodesic.h
put State save. geodesic in memory,
grab memState
Run geodesic.h => newMemState
Send newMemState to 4D unit.
```

In some embodiment, a 4D time print structure, with integrated haptic data, and encoded with time slice data, is stored in the graph database running on the real-time operating system. The 4D timeprint passes to the Output unit 280, running on its own timeprint CPU, providing the output to display and the process to virtually display the independent objects mapped by the 4D process. The temporal-haptic language is formed by running a machine learning algorithm over the 4-D timeslice bytestream. The process allows for the capture and characterization of haptic patterns. The haptic patterns are then tagged and stored and become shareable 4-dimensional artifacts.

Figure 11:
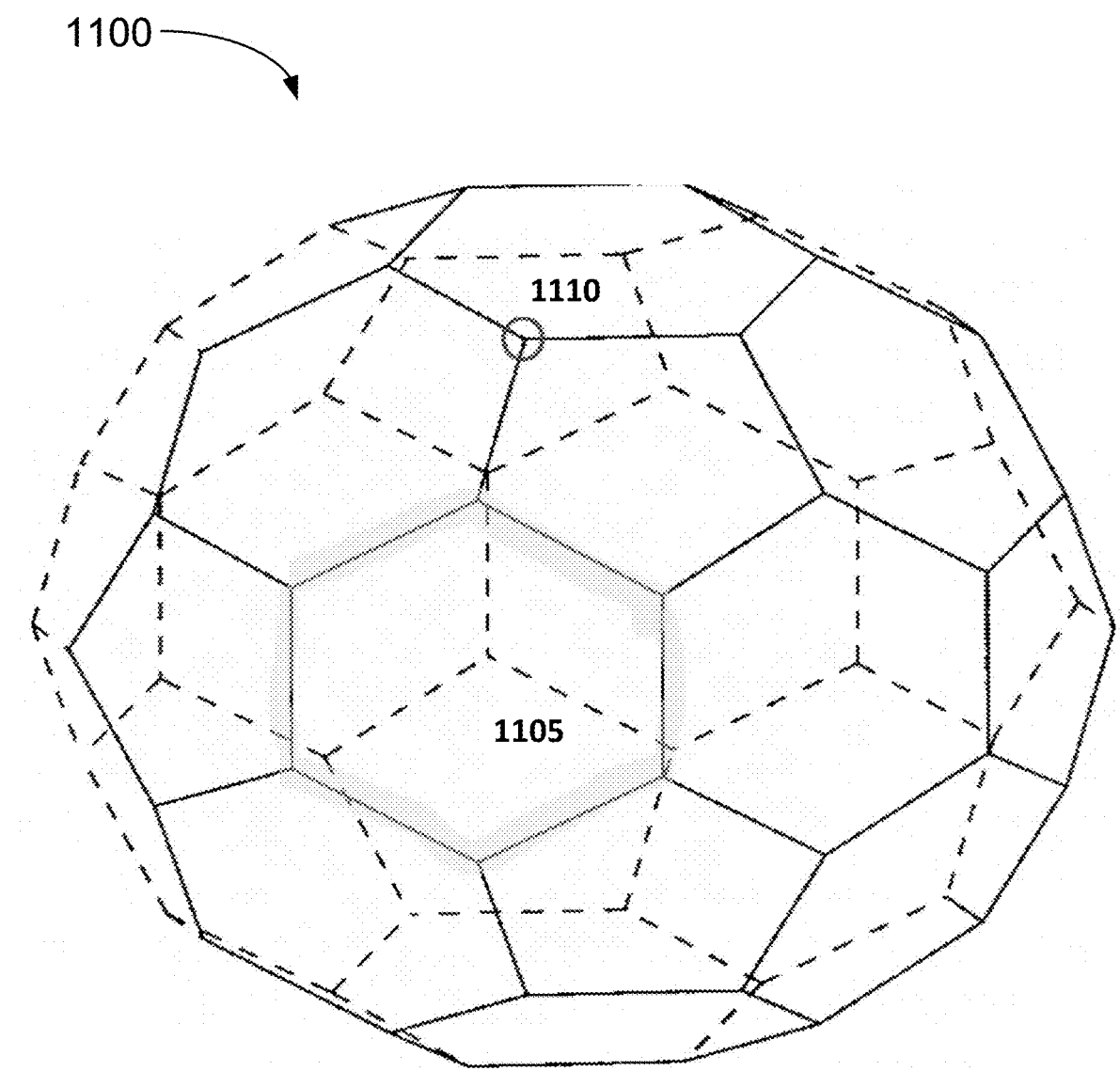
FIG. 11 is an illustration of an exemplary representation of an internal navigation matrix 1100, in accordance with an embodiment of the present invention.

FIG. 11 is an illustration of an exemplary representation of an internal navigation matrix 1100, in accordance with an embodiment of the present invention. In one embodiment of the present invention, a user looking at the screen or observing signals from the output unit use this set of shapes as an organizing matrix for navigation. Each of thirty-two (32) cells 1105, formed as a truncated icosahedron, represents operating of a separate application, data feed, or agent running as part of the user's overall group of applications. As a device that enables capture of motion, the organizing matrix re-draws the relative orientation of each cell.

Each face is pinioned by vertices 1110 forming the virtual hexagons or pentagons. The shape's geometry and orientation is passed from the output cloud. Thumbnail versions of the underlying applications display when in background. When called to the foreground using haptic manipulation, the application context is read from the P4XML key. Key data is then extended by reference to subsequent keys written while running in the foreground. The geodesic algorithm running on the 4D Unit (CPU b) uses this matrix structure as the surface on which the Geodesic surface of resolution is mapped.

The reduction routine based on the geodesic solution (lens) structure converts x, y, z-axis data, system handle data, bytestream data (application detail), and timestamp data into a representation of a wavefront surface of revolution that is then solved for using the above equation. The resulting single value using this geodesic algorithm is the 4D Key. The equation is encoded into the field programmable gate array logic which solves the equation on the CPU b and writes the result into a P4XML wrapper. Per each clock object, the result from the equation is unique and once decoded, can re-display the entire "moment" captured by the algorithm. The geodesic algorithm also encodes the display matrix using the 4D model comprise of a truncated icosahedron shape, representing 20 Hexagons and 12 pentagons, which serves as the organizing unit for the internal navigation model.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied. Such computers referenced and/or described in this disclosure may be any kind of computer, either general purpose, or some specific purpose computer such as, but not limited to, a workstation, a mainframe, GPU, ASIC, etc. The programs may be written in C. or Java, Brew, or any other suitable programming language. The programs may be resident on a storage medium, e.g., magnetic, or optical, e.g., without limitation, the computer hard drive, a removable disk, or media such as, without limitation, a memory stick or SD media, or other removable medium. The programs may also be run over a network, for example, with a server or other machine sending signals to the local machine, which allows the local machine to carry out the operations described herein.

Those skilled in the art will readily recognize, in light of and in accordance with the teachings of the present invention, that any of the foregoing steps may be suitably replaced, reordered, removed and additional steps may be inserted depending upon the needs of the particular application. Moreover, the prescribed method steps of the foregoing embodiments may be implemented using any physical and/or hardware system that those skilled in the art will readily know is suitable in light of the foregoing teachings. For any method steps described in the present application that can be carried out on a computing machine, a typical computer system can, when appropriately configured or designed, serve as a computer system in which those aspects of the invention may be embodied. Thus, the present invention is not limited to any particular tangible means of implementation.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

Those of skill in the art will appreciate that where appropriate, some embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Where appropriate, embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

"Software" may refer to prescribed rules to operate a computer. Examples of software may include: code segments in one or more computer-readable languages; graphical and or/textual instructions; applets; pre-compiled code; interpreted code; compiled code; and computer programs.

While embodiments herein may be discussed in terms of a processor having a certain number of bit instructions/data, those skilled in the art will know others that may be suitable such as 16 bits, 32 bits, 64 bits, 128s or 256 bit processors or processing, which can usually alternatively be used. Where a specified logical sense is used, the opposite logical sense is also intended to be encompassed.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™ or other compilers, assemblers, interpreters or other computer languages or platforms.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as webpages. Websites comprise a collection of connected, or otherwise related, webpages. The combination of all the websites and their corresponding webpages on the Internet is generally known as the World Wide Web (WWW) or simply the Web.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, removable media, flash memory, a "memory stick", any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are exemplary arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, an object-based model could be used to store and manipulate the data types of the present invention and likewise, object methods or behaviors can be used to implement the processes of the present invention.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

As used herein, the "client-side" application should be broadly construed to refer to an application, a page associated with that application, or some other resource or function invoked by a client-side request to the application. A "browser" as used herein is not intended to refer to any specific browser (e.g., Internet Explorer, Safari, FireFox, or the like), but should be broadly construed to refer to any client-side rendering engine that can access and display Internet-accessible resources. A "rich" client typically refers to a non-HTTP based client-side application, such as an SSH or CFIS client. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

More specifically, as will be appreciated by one skilled in the art, aspects of the present invention may be embodied as a system, method or computer program product. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Additionally, the phrase "configured to" or "operable for" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

While a non-transitory computer readable medium may include, but is not limited to, a hard drive, compact disc, flash memory, volatile memory, random access memory, magnetic memory, optical memory, semiconductor based memory, phase change memory, periodically refreshed memory, quantum memory, and the like; the non-transitory computer readable medium, however, does not include a pure transitory signal per se; i.e., where the medium itself is transitory.

All the features disclosed in this specification, including any accompanying abstract and drawings, may be replaced by alternative features serving the same, equivalent, or similar purpose, unless expressly stated otherwise. Thus, unless expressly stated otherwise, each feature disclosed is one example only of a generic series of equivalent or similar features.

It is noted that according to USA law 35 USC § 112 (1), all claims must be supported by sufficient disclosure in the present patent specification, and any material known to those skilled in the art need not be explicitly disclosed. However, 35 USC § 112 (6) requires that structures corresponding to functional limitations interpreted under 35 USC § 112 (6) must be explicitly disclosed in the patent specification. Moreover, the USPTO's Examination policy of initially treating and searching prior art under the broadest interpretation of a "mean for" or "steps for" claim limitation implies that the broadest initial search on 35 USC § 112(6) (post AIA 112(f)) functional limitation would have to be conducted to support a legally valid Examination on that USPTO policy for broadest interpretation of "mean for" claims. Accordingly, the USPTO will have discovered a multiplicity of prior art documents including disclosure of specific structures and elements which are suitable to act as corresponding structures to satisfy all functional limitations in the below claims that are interpreted under 35 USC § 112(6) (post AIA 112(f)) when such corresponding structures are not explicitly disclosed in the foregoing patent specification. Therefore, for any invention element(s)/structure(s) corresponding to functional claim limitation(s), in the below claims interpreted under 35 USC § 112(6) (post AIA 112(f)), which is/are not explicitly disclosed in the foregoing patent specification, yet do exist in the patent and/or non-patent documents found during the course of USPTO searching, Applicant(s) incorporate all such functionally corresponding structures and related enabling material herein by reference for the purpose of providing explicit structures that implement the functional means claimed. Applicant(s) request(s) that fact finders during any claim's construction proceedings and/or examination of patent allowability properly identify and incorporate only the portions of each of these documents discovered during the broadest interpretation search of 35 USC § 112(6) (post AIA 112(f)) limitation, which exist in at least one of the patents and/or non-patent documents found during the course of normal USPTO searching and or supplied to the USPTO during prosecution. Applicant(s) also incorporate by reference the bibliographic citation information to identify all such documents comprising functionally corresponding structures and related enabling material as listed in any PTO Form-892 or likewise any information disclosure statements (IDS) entered into the present patent application by the USPTO or Applicant(s) or any $3^{rd}$ parties. Applicant(s) also reserve its right to later amend the present application to explicitly include citations to such documents and/or explicitly include the functionally corresponding structures which were incorporate by reference above.

Thus, for any invention element(s)/structure(s) corresponding to functional claim limitation(s), in the below claims, that are interpreted under 35 USC § 112(6) (post AIA 112(f)), which is/are not explicitly disclosed in the foregoing patent specification, Applicant(s) have explicitly prescribed which documents and material to include the otherwise missing disclosure, and have prescribed exactly which portions of such patent and/or non-patent documents should be incorporated by such reference for the purpose of satisfying the disclosure requirements of 35 USC § 112 (6). Applicant(s) note that all the identified documents above which are incorporated by reference to satisfy 35 USC § 112 (6) necessarily have a filing and/or publication date prior to that of the instant application, and thus are valid prior documents to incorporated by reference in the instant application.

Having fully described at least one embodiment of the present invention, other equivalent or alternative methods of implementing systems and methods for generating a four-dimensional object type and encoding key according to the present invention will be apparent to those skilled in the art. Various aspects of the invention have been described above by way of illustration, and the specific embodiments disclosed are not intended to limit the invention to the particular forms disclosed. The particular implementation of the systems and methods for generating a four-dimensional object type and encoding key may vary depending upon the particular context or application. By way of example, and not limitation, the systems and methods for generating a four-dimensional object type and encoding key described in the foregoing were principally directed to displaying and manipulating time line objects using motion implementations; however, similar techniques may instead be applied to gaming devices using the timeline encoding structure to enable novel gameplay patterns and interactions, military/intelligence $C^4I$ using the timeline encoding and state save brokerage capabilities to roll up billions or trillions of fast-evolving data points in order to provide scenario construction enabling command-level decision making, and Formula-1 Race team control coordination device in order to collect fast-moving data for scenario planning, which implementations of the present invention are contemplated as within the scope of the present invention. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Claim elements and steps herein may have been numbered and/or lettered solely as an aid in readability and understanding. Any such numbering and lettering in itself is not intended to and should not be taken to indicate the ordering of elements and/or steps in the claims.

The corresponding structures, materials, acts, and equivalents of all means or step plus function elements in the claims below are intended to include any structure, material, or act for performing the function in combination with other claimed elements as specifically claimed.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The Abstract is provided to comply with 37 C.F.R. Section 1.72(b) requiring an abstract that will allow the reader to ascertain the nature and gist of the technical disclosure. That is, the Abstract is provided merely to introduce certain concepts and not to identify any key or essential features of the claimed subject matter. It is submitted with the understanding that it will not be used to limit or interpret the scope or meaning of the claims.

The following claims are hereby incorporated into the detailed description, with each claim standing on its own as a separate embodiment.

Only those claims which employ the words "means for" or "steps for" are to be interpreted under 35 USC 112, sixth paragraph (pre-AIA) or 35 USC 112(f) post-AIA. Otherwise, no limitations from the specification are to be read into any claims, unless those limitations are expressly included in the claims.

What is claimed is:

1. A device comprising:
   a Geodesic FPGA, wherein said Geodesic FPGA comprises a field programmable gate array that is configured to set a coherent clock time frame for data captured in said device;
   a plurality of faces of an information space, wherein said field programmable gate array is configured to create a metadata that is operable for capturing a state of each of said plurality of faces on the information space;
   a geodesic lens algorithm running on said Geodesic FPGA, wherein said geodesic lens algorithm comprises a geodesic equation built into said field programmable gate array, and wherein said geodesic equation is configured to create said metadata;
   a plurality of dimensions related foreground and background objects; and
   an anamorphic display engine, wherein said anamorphic display engine is configured to transduce said plurality of dimensions related foreground and background objects and to render the objects relative motion in time.

2. The device according to claim 1, further comprising a 4-dimensional extensible Markup Language that handles all the rendering and processing necessary for the device to display information on device surface as well as to pass information back and forth to underlying virtual resources.

3. The device according to claim 2, further comprising an accelerometer array gauging motion and user activity in a channelized 3D data.

4. The device according to claim 3, further comprising:
   a system state timer;
   a time stamp generated by the system state timer.

5. The device according to claim 4, further comprising a timeprint that is configured to identify said objects, wherein said time print comprises keys.

6. The device according to claim 5, further comprising a state save brokerage engine that is configured to determine a predetermined level of detail with which to encode timeprint "moments".

7. The device according to claim 1, in which said information space comprises a truncated icosahedron shape.

8. The device according to claim 7, wherein application and data feed states are saved according to the relative locations of said objects on said truncated icosahedron shape.

9. The device according to claim 1, in which said information space comprises a proximately 32 face, 60 vertex shape of a common soccer ball.

10. The device according to claim 9, wherein the geodesic lens algorithm implements the geometry of the common soccer ball shape.

11. The device according to claim 10, in which a state save memory stores that geometry of the common soccer ball shape.

12. The device according to claim 11, wherein when said time stamp is generated, said device grabs the data stored in said state save memory and compresses the data using the geodesic lens algorithm.

13. The device according to claim 12, wherein the device grabs an x, y, and z axis geometry and embed with the state save memory at said time stamp, drives the system state timer, and implements the geodesic lens algorithm to create at least one time print key.

14. A device comprising:
   a field programmable gate array that is configured to set a coherent clock time frame for data captured in said device;
   a plurality of faces of an information space, wherein said field programmable gate array is configured to create a metadata that is operable for capturing a state of each of said plurality of faces on the information space;
   a geodesic lens running on said field programmable gate array, wherein said geodesic lens comprises a geodesic equation that is configured to create said metadata;
   a plurality of dimensions related foreground and background objects; and
   an anamorphic display engine, wherein said anamorphic display engine is configured to transduce said plurality of dimensions related foreground and background objects and to render the objects relative motion in time.

15. A device comprising:

a plurality of faces of an information space, wherein a field programmable gate array is configured to create a metadata that is operable for capturing a state of each of said plurality of faces on the information space;

a geodesic lens running on said field programmable gate array, wherein said geodesic lens comprises a geodesic equation that is configured to create said metadata;

a plurality of visual dimensions related foreground and background objects;

an anamorphic display engine, wherein said anamorphic display engine is configured to transduce said plurality of visual dimensions related foreground and background objects and to render the objects relative motion in time; and in which said information space comprises at least one of a truncated icosahedron shape, wherein application and data feed states are saved according to the relative locations of said objects on said truncated icosahedron shape and a proximately 32 face, 60 vertex shape of a common soccer ball, wherein the geodesic lens algorithm implements the geometry of the common soccer ball shape.

* * * * *